United States Patent
Le Clerc et al.

(10) Patent No.: US 9,621,821 B2
(45) Date of Patent: Apr. 11, 2017

(54) METHOD FOR SHOOTING A PERFORMANCE USING AN UNMANNED AERIAL VEHICLE

(71) Applicant: THOMSON LICENSING, Issy de Moulineaux (FR)

(72) Inventors: Francois Le Clerc, L'Hermitage (FR); Caroline Baillard, St. Sulpice La Foret (FR); Nicolas Mollet, Meillac (FR)

(73) Assignee: Thomson Licensing (FR)

( * ) Notice: Subject to any disclaimer, the term of this patent is extended or adjusted under 35 U.S.C. 154(b) by 323 days.

(21) Appl. No.: 14/203,471

(22) Filed: Mar. 10, 2014

(65) Prior Publication Data

US 2014/0267777 A1 Sep. 18, 2014

(30) Foreign Application Priority Data

Mar. 12, 2013 (EP) .................................... 13305269

(51) Int. Cl.
| | | |
|---|---|---|
| H04N 5/28 | (2006.01) | |
| G05D 1/10 | (2006.01) | |
| G03B 15/00 | (2006.01) | |
| G03B 15/07 | (2006.01) | |
| G03B 19/18 | (2006.01) | |
| G06F 19/00 | (2011.01) | |
| H04N 5/222 | (2006.01) | |

(52) U.S. Cl.
CPC ............. *H04N 5/28* (2013.01); *G03B 15/006* (2013.01); *G03B 15/07* (2013.01); *G05D 1/101* (2013.01); *H04N 5/2224* (2013.01)

(58) Field of Classification Search
CPC ....... A63J 2005/008; A63J 5/00; G03B 15/08; G03B 21/00; G03B 21/32
See application file for complete search history.

(56) References Cited

U.S. PATENT DOCUMENTS

| | | | | |
|---|---|---|---|---|
| 7,468,778 | B2 * | 12/2008 | Thomas | G03B 15/06 348/E5.022 |
| 7,643,893 | B2 * | 1/2010 | Troy | G05D 1/0234 700/65 |
| 2010/0178966 | A1 * | 7/2010 | Seydoux | A63F 13/10 463/2 |

(Continued)

FOREIGN PATENT DOCUMENTS

| | | |
|---|---|---|
| JP | 2009212582 | 9/2009 |
| WO | WO2008013648 | 1/2008 |

OTHER PUBLICATIONS

Jens Herder et al., "TouchPlanVS—A Tangible Multitouch Planning System for Virtual TV Studio Productions", pp. 103-104, IEEE Symposium on 3D User Interfaces, Mar. 19-20, 2011 Singapore, 978-1-4577-0064-4/11, 2011 IEEE.

(Continued)

*Primary Examiner* — Sath V Perungavoor
*Assistant Examiner* — Howard D Brown, Jr.
(74) *Attorney, Agent, or Firm* — Jack Schwartz & Associates, PLLC

(57) ABSTRACT

A method for shooting a performance making use of umanned aerial vehicles, such as drones for example, to provide the physical markers that are needed to give a physical actor indications on the positioning of virtual elements to be inserted later in the scene, and with which s/he needs to interact.

8 Claims, 2 Drawing Sheets

(56) References Cited

U.S. PATENT DOCUMENTS

2011/0299732 A1* 12/2011 Jonchery ............... A63H 27/12
                                                    382/103
2012/0281114 A1* 11/2012 Shapiro ............... G11B 27/034
                                                    348/231.99

OTHER PUBLICATIONS

Namgyu Kim et al., "3-D Virtual Studio for Natural Inter-"Acting"", pp. 758-773, IEEE Transactions on Systems Man and Cybernetics—Part A: Systems and Humans, vol. 36, No. 4, Jul. 2006, 1083-4427/ 2006, IEEE.

Michihiko Minoh et al., "Direct Manipulation of 3D Virtual Objects by Actors for Recording Live Video Content", Second International Conference on Informatics Research for Development of Knowledge Society Infrastructure (ICKS'07), 0-7695-2811-2/07, 2007 IEEE.

Obara et al: "Use of Adaptive Registration for Improving Presentation of Three-Dimensional Virtual Objects in a Virtual Studio" pp. 979-989, Journal of the Institute of Image Information and Television Engineers, vol. 61, No. 7, Institute of Image Information and Television Engineers.

http://ardrone2.parrot.com/.

http://www.asctec.de/downloads/public/AscTec-Hummingbird_Safetydatasheet.pdf.

http://www.virtalis.com/products/79/vicon-.php.

https://www.youtube.com/watch?feature=player_embedded&v=ToACDIXTzo0.

https://www.youtube.com/user/ARdrone.

Nathan etal: "The Grasp Multiple Micro UAV Testbed", IEEE Robotics & Automation Magazine, vol. 17, n°39, Sep. 2010(Sep. 9, 2010), pp. 56-65.

The Wikipedia page on "PID Controllers", http//en.wikipedla.org/wiki/PID-controller, updated Mar. 3, 2014, pp. 1-17.

G.B. Guerra-Filho: "Optical Motion Capture: Theory and Implementation", published in the Journal of Theoretical and Applied Informatics, in 2005, pp. 1-29.

Search Report Dated Aug. 12, 2013.

* cited by examiner

METHOD FOR SHOOTING A PERFORMANCE USING AN UNMANNED AERIAL VEHICLE

This application claims the benefit, under 35 U.S.C. §119 of European Patent Application No. 13305269.6, filed Mar. 12, 2013.

1. FIELD OF INVENTION

This invention generally relates to a method for shooting a performance in which at least one actor interacts with a virtual element moving along a determined motion trajectory.

The invention relies on a specific unmanned aerial vehicle, an apparatus and a film shooting studio.

2. TECHNICAL BACKGROUND

Computer-Generated Imagery is increasingly present in film and TV production. Dedicated techniques are needed to ensure seamless compositing and interaction between the virtual and real elements of a scene.

In a typical scenario, the performance of real actors is composited with a virtual background. This is, for instance, the situation in a virtual TV studio, where the news presenter is filmed against a green background, and the furniture and background of the studio are inserted later as virtual elements. Chroma keying is used to matte out the silhouette of the journalist for compositing with the virtual elements in the scene.

It may also be that all the elements in the scene are virtual, but the animated parts (humans, creatures) are obtained from the performance of actors in a TV or film shooting studio.

A TV or film shooting studio is usually equipped with an optical motion capture system which consists of a camera setup and an acquisition system.

The camera setup consists of a set of calibrated cameras placed around a capture volume. Typically, the actors wear dedicated suits where physical markers are placed at the location of the main body articulations. The actors play the role of the film characters or virtual creatures inside the capture volume, as defined by the scenario.

The optical motion capture system tracks the locations of the physical markers in the images captured by the cameras. This data is fed into animation and rendering software that generates the appearance of virtual characters or creatures at each frame of the target production.

In the simplest situations, there is no interaction at all between the real and virtual elements in the scene, and the spatial separation between these elements is easy to achieve. This is for instance the case in a virtual TV news studio, where the only virtual element is the background located behind the presenter.

Even in the absence of interaction between the real and virtual elements, the compositing becomes more complex when real elements are partially occluded by virtual elements placed in front of them, as seen by the camera. Some form of real-time depth keying is then required to ensure proper management of the occlusions in order to avoid that, say, the leg of the presenter that should normally be masked by a virtual table in front of him does not appear in the composited image in front of the table.

Interactions between real and virtual elements are even more difficult to manage. Imagine, for instance, a news presenter is asked to lay his hand on a virtual table. The table is not physically present when the presenter is filmed making the hand gesture in the green-screen environment. A marking on the floor of the virtual studio may tell him where to stand in order to be correctly positioned with respect to the table, but telling him/her where exactly the hand should be placed in order to lie exactly on the surface of the table after it has been inserted in the picture would require a marker "floating in air". This is impractical.

Arguably, a misplacement of the presenter's hand in this case could be fixed during the compositing phase by tweaking the viewpoint of the virtual camera. However, this solution would not be applicable to multiple interactions occurring with elements of a rigid virtual layout, since the adjustments would need to be different for each interaction.

The complexity of managing interactions between real and virtual elements is maximal when they are both moving. An example of such a situation would be, for instance, a film character represented by a real actor attempting to step into a virtual train, with the train already in motion. The actor filmed in the green screen environment would need to simulate grasping a handle in the door of a carriage while this door is translating, and accelerating. Adjusting the desired location of the actor's hand would require following over time some marking of the predefined trajectory of the carriage door handle in 3D space. No other solution to this problem other than ad-hoc fixes in the compositing phase was found in prior art.

3. SUMMARY OF THE INVENTION

The present invention solves the aforementioned drawbacks by using umanned aerial vehicles, such as drones for example, to provide the physical markers that are needed to give the real actors indications on the positioning of virtual elements to be inserted later in the scene, and with which they need to interact.

More precisely, according to one of its aspects, the invention concerns an unmanned aerial vehicle which is characterized in that a part of said unmanned aerial vehicle follows a determined motion trajectory of a contact location of a virtual element in a scene that it materializes.

Said part of the unmanned aerial vehicle is then a physical marker "floating in the air" that allow an interaction occurring between an actor and a real virtual element of a scene. Multiple unmanned aerial vehicles may be used and each of them may be controlled with different adjustments to reproduce interactions between real and/or virtual elements even when these elements are moving along different motion trajectories.

According to an other aspect, the invention concerns a method for shooting a performance in which at least one actor interacts with a virtual element moving along a determined motion trajectory. The method is characterized in that it makes use of an unmanned aerial vehicle navigation control capability.

According to another aspect, the invention concerns an apparatus comprising means to specify a 3D position of an unmanned aerial vehicle according to a determined motion trajectory. The apparatus is characterized in that said means are configured in order that a part of the unmanned aerial vehicle follows the motion trajectory at a predefined speed, said motion trajectory being determined in order to allow interactions occurring between real and/or virtual elements of a scene.

According to another aspect, the invention concerns a film shooting studio which is characterized in that it is equipped with at least one unmanned aerial vehicle as previously disclosed and an apparatus as previously disclosed.

The specific nature of the invention as well as other objects, advantages, features and uses of the invention will become evident from the following description of a preferred embodiment taken in conjunction with the accompanying drawings.

4. LIST OF FIGURES

The embodiments will be described with reference to the following figures.

5. DETAILED DESCRIPTION OF A PREFERRED EMBODIMENT OF THE INVENTION

Figure 1:
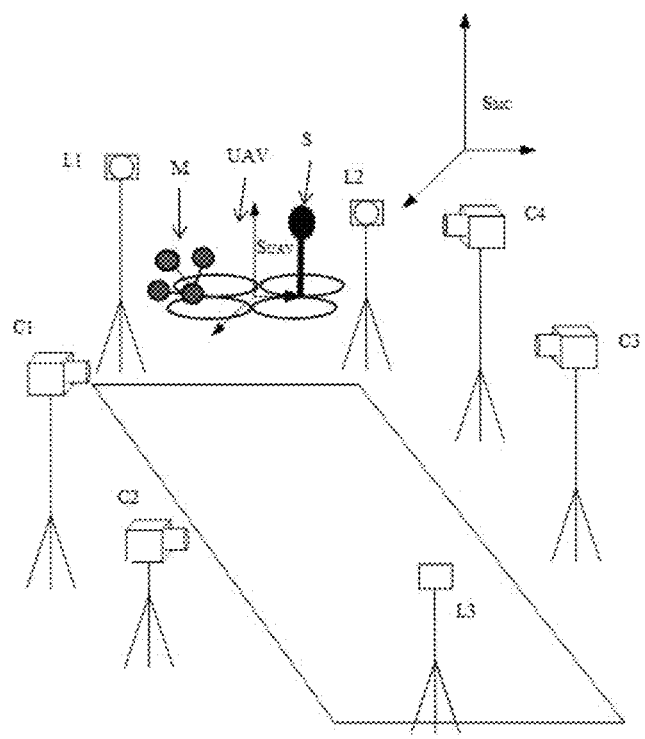
FIG. 1 shows schematically an example of a TV or film shooting studio.

FIG. 1 shows an example of a TV or film shooting studio. The invention is not limited to this single example but may extend to any indoor or outdoor environment which is adapted to capture the optical motion of an object from images of physical markers.

A TV or film shooting studio is a room equipped with an optical motion capture system which comprises a camera setup and an acquisition system.

The camera setup comprises cameras, here four referenced C1 to C4, and light sources, here three referenced L1 to L3.

The TV or film shooting studio is surrounded, at least partially, by walls which are painted in a uniform green or blue colour, so that actors or props filmed in the studio can be easily segmented out from the background of the studio using chroma keying. The studio needs to be large enough to hold the camera setup and make sure that the volume captured by this setup, called the capture volume, allows sufficient room for the props and the performance of the actors.

The cameras, here C1-C4, are positioned all around the capture volume usually in the center of the room, in such a way that any point within this volume is seen by a minimum of 3 cameras, and preferably more. The cameras must be synchronized, typically from an external genlock signal, and operate at sufficiently high frame rates (to avoid motion blur) and with sufficient resolution to accurately estimate the motion trajectories of physical markers used for motion capture. Furthermore, the cameras are calibrated, both with respect to their intrinsic and extrinsic parameters, so that the location on a camera image of the projection of any 3D point of the motion capture volume in its viewing frustum, referenced in some 3D coordinate system $S_{MC}$, can be accurately predicted.

Lighting in the TV or film shooting studio relies on a set of fixed light sources, here L1 to L3 that provides an ideally diffuse and uniform lighting within the capture volume.

The time-stamped video signals captured by the camera setup are transferred and recorded from each of the cameras to a storage device, typically hard disk drives, thanks to the acquisition system (not represented in FIG. 1). The acquisition system also features a user interface and software for controlling the operation of the cameras and visualizing their outputs.

Tracking the motion of an object equipped with physical markers using such an optical motion capture system is well-known from prior art, and follows the principles described for instance by G. B. Guerra-Filho in "Optical Motion Capture: Theory and Implementation", published in the Journal of Theoretical and Applied Informatics in 2005.

The tracking method comprises detecting the locations of the physical markers in the images of the cameras. This is straightforward, as markers, owing to their high reflectivity, appear as bright spots in the images. Next, spatial correspondences between the detected markers locations across camera images are established. A 3D point in the 3D coordinate system $S_{MC}$ having generated a detected location in a camera image lies on a viewing line going through this location in the camera image plane and the camera projection centre. Spatial correspondences between detected locations across camera views, corresponding to the projections in the views of physical markers, can be determined by the fact that the above-defined viewing lines for each considered camera intersect at the location of the physical marker in 3D space. The locations and orientations of the image plane and projection center for each camera are known from the camera calibration data. Next, the detected marker locations set in correspondence, and thus corresponding to the projections of physical markers, are tracked over time for each camera image. Temporal tracking typically relies on non-rigid point set registration techniques, wherein a global mapping is determined between the distributions of marker locations between two consecutive images of the same camera in consecutive frames. Next, the marker tracks are labeled. This can be performed manually, or alternatively the labels can be set automatically. Automatic labeling can benefit from a known initial layout of markers, for instance, in the case of body motion capture, the "T-stance" where the person stands with legs apart and both arms stretched away from the body. Next, the captured data is post-processed, especially in order to fill holes caused by marker occlusion. This can be automated up to some point using priors from a model of the captured object (e.g., an articulated body model) that constrains the locations of the missing markers when most of the markers locations are known, but needs to be performed manually if too many marker locations are missing.

Optionally, specifically for body motion capture, an articulated human body is fitted to the 3D locations of physical markers at each frame, thus providing data for animating a virtual character (possibly after retargeting if the anthropometric proportions of the actor and the virtual character are different).

At least four non-planar physical markers M detectable by the optical motion capture system are located on an unmanned aerial vehicle UAV schematically represented in FIG. 1, where the unmanned aerial vehicle UAV is represented by the four ovales and the markers M are represented by black filled disks.

The non-coplanar physical markers define a 3D coordinate system $S_{UAV}$ for the unmanned aerial vehicle UAV, whose relative translation and rotation with respect to the 3D coordinate system $S_{MC}$ can be computed using straightforward 3D geometry, the locations of the markers in $S_{MC}$ being determined by the optical motion capture system.

According to the invention, a part of the unmanned aerial vehicle UAV follows a determined motion trajectory of a contact location of a virtual element in a scene that it materializes.

Advantageously, a stick S is rigidly attached to the unmanned aerial vehicle UAV, as represented on FIG. 1, in such a way that its extremity can be accessed without danger of getting hurt by the unmanned aerial vehicle propellers. The location of the extremity of the stick S mounted on the unmanned aerial vehicle UAV is fixed and known in the 3D coordinate system $S_{UAV}$, and can therefore easily be computed in the 3D coordinate system $S_{MC}$. The extremity of the stick S is then the part of the unmanned vehicle which follows the determined motion trajectory of a contact location of a virtual element in a scene that it materializes.

Complex scenes may require several unmanned aerial vehicles UAV, on each of which at least four physical markers are located.

According to an embodiment of the invention, when several unmanned aerial vehicles UAV are used to shoot a scene, a minimal separation distance between these unmanned aerial vehicles UAV is maintained at all times, to avoid aerodynamic interference.

According to another embodiment, the unmanned aerial vehicle is a drone.

A drone is a lightweight unmanned aerial vehicle powered by multiple rotors, typically 4 to 8, running on batteries. The drone is equipped with onboard electronics including processing means, an Inertial Measurement Unit and additional position and velocity sensors for navigation, and with means for wireless communication with a remote apparatus.

The navigation of a drone can be controlled by a so-called navigation control method usually implemented on a remote station over a dedicated Application Programming Interface (API) which may provide access to low-level controls, such as the speeds of the rotors, and/or to higher-level features such as a target drone attitude, elevation speed or rotation speed around the vertical axis passing through the drone center of mass.

The navigation control method can be developed on top of this API in order to control the displacements of the drone in real-time. The control can be performed manually from a user interface, for instance relying on graphical pads on a mobile device display. Alternatively, the navigation of the drone can be constrained programmatically to follow a determined motion trajectory. This motion trajectory defines a target 3D position of the center of mass of the drone in some reference 3D coordinate system at each time instant after a reference start time.

The navigation control method can benefit from the positional estimates of the drone provided by an optical motion capture system. Such a closed-loop feedback control of a drone using an optical motion capture system is described, for example, in the paper entitled <<*The GRASP Multiple Micro UAV Testbed*>>, by N. Michael et al., published in the September 2010 issue of the *IEEE Robotics and Automation Magazine*, September 2010. In this paper, the control of the drone relies on two nested feedback loops, as shown on FIG. 2. The purpose of the loops is to ensure that the actual attitude and position values of the drone, as computed from the IMU and positional sensors measurements, match the target values determined by a target trajectory. Typically, this is obtained by continuously adjusting the control loop parameters in order to minimize the error between the measured and target values, as in well-known PID controllers (see the Wikipedia page on PID controllers, http://en.wikipedia.org/wiki/PID_controller).

Figure 2:
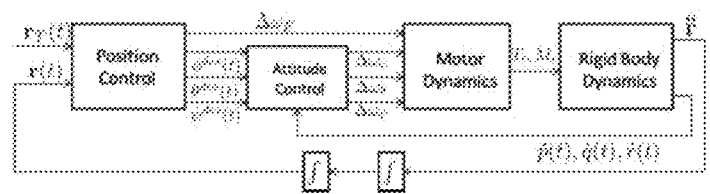
FIG. 2 shows schematically a diagram illustrating a possible control scheme of the attitude and position of a drone, and FIG. 3 show an example of an internal architecture of an apparatus configured to control the navigation of an unmanned aerial vehicle.

Into more detail, with reference to FIG. 2, the Position Control module takes as input, at each time instant t, the target 3D position of the drone center of mass $r_T(t)$ and its estimated position $r(t)$ in the coordinate system of the motion capture volume $S_{MC}$. According to the invention, the accurate estimates of $r(t)$ provided by the motion capture system, owing to the non-coplanar retro-reflective markers attached to the drone, can advantageously be fed into the navigation control method, in order to improve the stability and accuracy of the motion trajectory following.

More precisely, a control loop within the position control module generates, as a function of the positional error $r_T(t)-r(t)$, the desired values of the attitude angles $\phi_{des}(t)$, $\theta_{des}(t)$ and $\psi_{des}(t)$ or the roll, pitch and yaw angles respectively, that stabilize the attitude of the drone and ensure the desired linear displacement that compensates for the positional error. The Attitude Control module is a second, inner, control loop that generates the increments of the moments $\Delta\omega_\phi$, $\Delta\omega_\theta$, $\Delta\omega_\psi$, to be produced by the drone rotors along the roll, pitch and yaw axes respectively, in order to obtain the desired attitude values. In addition, the position control module feeds the motor dynamics module with an extra moment $\Delta\omega_F$ that results in a net force along the vertical axis at the center of gravity of the drone, allowing the control of its altitude. The Motor Dynamics module translates $\Delta\omega_\phi$, $\Delta\omega_\theta$, $\Delta\omega_\psi$ and $\Delta\omega_F$ into set point values for the rotor speeds, that are transmitted to the drone via its communication means, so that the rotor speeds are updated over the API. Using a model of the drone motors, the Motor Dynamics module translates the updates of the rotors speeds into net forces $T_i$ applied to the drone along the vertical axes at the location of each rotor, as well as into angular moments $M_i$ along these same axes. From these forces and angular moments, a model of the drone dynamics allows to compute, in the Rigid Body Dynamics module, the linear acceleration of the drone $\ddot{r}$ and its angular accelerations $\dot{p}(t)$, $\dot{q}(t)$ and $\dot{r}(t)$ in its body frame. These accelerations are fed back to the Position Control and Attitude Control modules, respectively, to provide the inputs to the control loops implemented in these two modules.

Note that the Position Control and Attitude Control loops use measurements, not represented on FIG. 2, from the Inertial Measurement Unit and the positional sensors mounted on the drone, in order to estimate the drone position and attitude at their inputs.

The invention also concerns a method for shooting a performance in which at least one actor interacts with a virtual element moving along a determined motion trajectory comprises two phases, both making use of an unmanned aerial vehicle UAV navigation control capability.

In a first initialization phase, prior to the start of the shooting, a part of the unmanned aerial vehicle UAV, such as the extremity of the stick S, is moved to the initial position of a determined motion trajectory of a contact location of a virtual element in the scene that it materializes. Upon a trigger signal synchronized with the action taking place during the shooting, for instance provided by a member of the on-set staff, the part of the unmanned aerial vehicle UAV is moved along said determined motion trajectory, either manually from a control interface, or programmatically.

In a second phase, triggered by a signal synchronized with the captured performance, which may be provided for instance by a member of the on-set staff, the unmanned aerial vehicle UAV is displaced so that its part which materializes the contact location of the virtual element follows said determined motion trajectory.

For the purpose of a motion capture session involving an interaction of at least one of the actors in the studio with at least one element of a virtual scene, a 3D model of the virtual scene is assumed known and registered with the 3D coordinate system $S_{MC}$. The motion trajectories of all moving virtual elements within the 3D virtual scene model are predefined from the scenario of the performance to be captured. These motion trajectories are represented by a temporal sequence of 3D locations in the 3D coordinate system $S_{MC}$, defined with reference to a predefined start time $t_{ref}$, typically set to the starting time of the performance to be captured. The sampling frequency of this sequence is chosen, for example, so as to be compatible with the rate at which the target 3D position of the drone center of mass $r_T(t)$ can be estimated.

According to the invention, the location of contact on each of the moving virtual elements of the performance where, for instance an actor should interact with the element, for instance by placing a hand on this location, is materialized by a part of an unmanned aerial vehicle UAV such as, according to an embodiment, the extremity of a stick S. As the 3D coordinate system $S_{UAV}$ is registered with respect to the 3D coordinate system $S_{MC}$, the coordinate of this location of contact on the unmanned aerial vehicle UAV can be expressed in the 3D coordinate system $S_{MC}$ via a straightforward change of coordinate system, and therefore matched at any time against the target location of the virtual element, also expressed in the 3D coordinate system $S_{MC}$.

Figure 3:
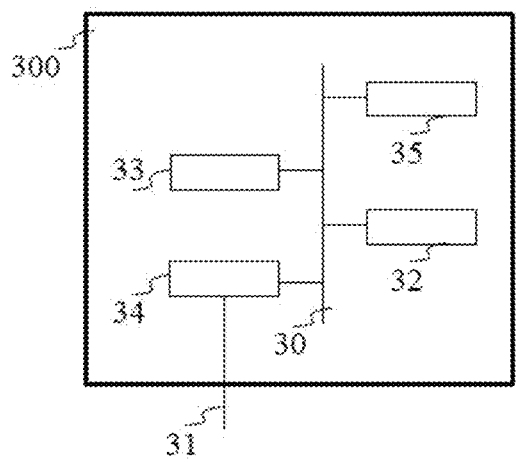

FIG. 3 shows an apparatus 300 that can be used in a Film or TV studio to control an unmanned aerial vehicle. The apparatus comprises the following components, interconnected by a digital data- and address bus 30:
- a processing unit 33 (or CPU for Central Processing Unit);
- a memory 35;
- a network interface 34, for interconnection of apparatus 300 to other devices connected in a network via connection 31.

Processing unit 33 can be implemented as a microprocessor, a custom chip, a dedicated (micro-) controller, and so on. Memory 35 can be implemented in any form of volatile and/or non-volatile memory, such as a RAM (Random Access Memory), hard disk drive, non-volatile random-access memory, EPROM (Erasable Programmable ROM), and so on.

The processing unit 33, the memory 35 and the network interface 34 are configured to control the navigation of an unmanned aerial vehicle such as a drone, i.e. they are configured to specify a target position of the unmanned aerial vehicle at each time instant, corresponding to a determined motion trajectory in the 3D coordinate system $S_{UAV}$. It is then possible to control the unmanned aerial vehicle (a drone for example) in such a way that a part of it follows a motion trajectory in the 3D coordinate system $S_{MC}$ at a predefined speed, said motion trajectory being determined in order to allow interactions to occur between real and/or virtual elements of a scene. This form of control allows to combine the navigation of the unmanned aerial vehicle UAV with other features, for instance, related to the remote operation of a camera mounted on the unmanned aerial vehicle UAV.

According to a variant, the apparatus comprises a Graphical User Interface 32 which is configured to allow a user to specify the target position of the unmanned aerial vehicle UAV at each time instant. The unmanned aerial vehicle UAV trajectory control is then operated from the Graphical User Interface 32 that can take the form for example of a joystick or a tactile interface, e.g., on a tablet.

On FIGS. 2, and 3, the modules are functional units, which may or may not be in relation with distinguishable physical units. For example, these modules or some of them may be brought together in a unique component or circuit, or contribute to functionalities of a software. A contrario, some modules may potentially be composed of separate physical entities. The apparatus which are compatible with the invention are implemented using either pure hardware, for example using dedicated hardware such ASIC or FPGA or VLSI, respectively <<Application Specific Integrated Circuit>>, <<Field-Programmable Gate Array>>, <<Very Large Scale Integration>>, or from several integrated electronic components embedded in a device or from a brend of hardware and software components.

While not explicitly described, the present embodiments and variants may be employed in any combination or sub-combination.

The invention claimed is:

1. An unmanned aerial vehicle for indicating a position of a virtual element to be inserted into a video performance, comprising a detectable marker defining a 3D coordinate system for detecting a position of said unmanned aerial vehicle by an optical motion capture system; propellers for driving said unmanned aerial vehicle along a trajectory representative of movement of the virtual element within the video performance; and a physical marker extending from said unmanned aerial vehicle and accessible without contacting said propellers, said physical marker including a stick and an object positioned on an extremity of said stick, said object indicating a position of an interaction intended to occur between an actor within the video performance and the virtual element moving along said trajectory.

2. The unmanned aerial vehicle according to claim 1, wherein a position and attitude of the unmanned aerial vehicle with respect to the 3D coordinate system is controllable using a navigation control.

3. The unmanned aerial vehicle according to claim 2 wherein the detectable marker is a non-coplanar retro-reflective marker and the navigation control estimates a 3D position of a center of mass (r(t)) of the unmanned aerial vehicle from measurements provided by the optical motion capture system through the non-coplanar retro-reflective marker.

4. A method for shooting a performance in which at least one actor interacts with a mobile virtual element, the method comprising controlling navigation of an unmanned aerial vehicle to move along a trajectory representative of movement of the virtual element within the performance wherein a physical marker including an object on an extremity thereof extends from the unmanned aerial vehicle and is positioned to be accessible without contacting propellers of the unmanned aerial vehicle, the object materializing a mobile position of an interaction intended to occur between the at least one actor and the virtual element along the controlled trajectory, the position of interaction identifying a point for insertion of the virtual element into the performance.

5. The method according to the claim 4, further comprising controlling navigation of several unmanned aerial vehicles, and maintaining a minimal separation distance between the several unmanned aerial vehicles.

6. An apparatus for controlling an unmanned aerial vehicle indicating a position of a virtual element to be inserted into a video performance, said apparatus comprising
 a processor; and
 a network interface, wherein said processor determines a 3D position and speed of the unmanned aerial vehicle, and controls the unmanned aerial vehicle via the network interface to move according to a trajectory representative of movement and speed of the virtual element within the video performance whereby a physical marker extending from the unmanned aerial vehicle and including an object, the object being accessible without contacting propellers of the unmanned aerial vehicle as the unmanned aerial vehicle follows the trajectory representative of movement and speed of the virtual element within the video performance, said physical marker and object enabling interactions intended to occur between an actor and the virtual element moving along the trajectory.

7. A film shooting studio comprising at least one unmanned aerial vehicle for indicating a position of a virtual element to be inserted into a video performance, the unmanned aerial vehicle including a detectable marker defining a 3D coordinate system for detecting a position of said unmanned aerial vehicle by an optical motion capture system; propellers for driving said unmanned aerial vehicle along a trajectory representative of movement of the virtual element within the video performance; and a physical marker extending from said unmanned aerial vehicle and accessible without contacting said propellers, said physical marker including a stick and an object positioned on an extremity of said stick, said object indicating a position of an interaction intended to occur between an actor within the video performance and a virtual element moving along said trajectory.

8. The apparatus of claim 6, further comprising a user interface for controlling a target position and speed of the unmanned aerial vehicle upon receipt of an input command.

* * * * *